G. N. SHARP.
Latches for Gates. &c.

No. 145,368. Patented Dec. 9, 1873.

Witnesses:
A. Bennerkendorf.
C. Sedgwick

Inventor:
G. N. Sharp
Per Munn & Co
Attorneys.

UNITED STATES PATENT OFFICE.

GEORGE N. SHARP, OF LA PLATA, MISSOURI.

IMPROVEMENT IN LATCHES FOR GATES, &c.

Specification forming part of Letters Patent No. 145,368, dated December 9, 1873; application filed October 18, 1873.

*To all whom it may concern:*

Figure 7:
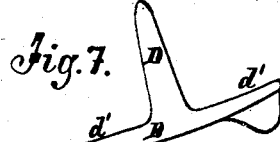
Figure 3:
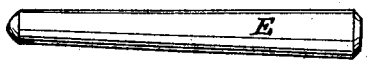
Figure 2:
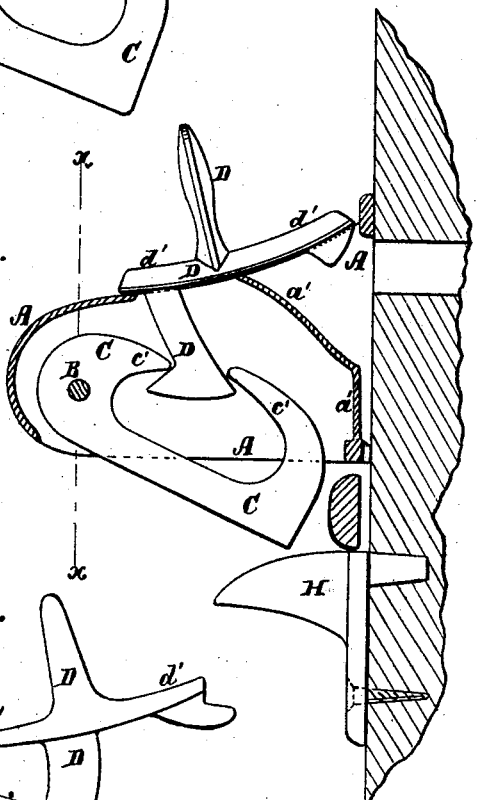
Figure 1:
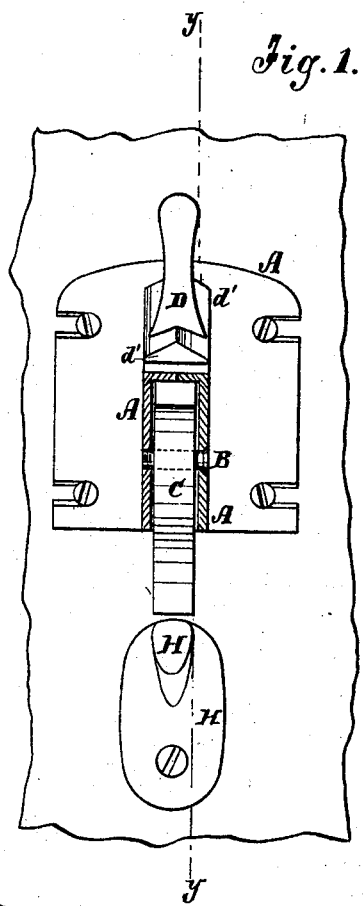
Figure 6:
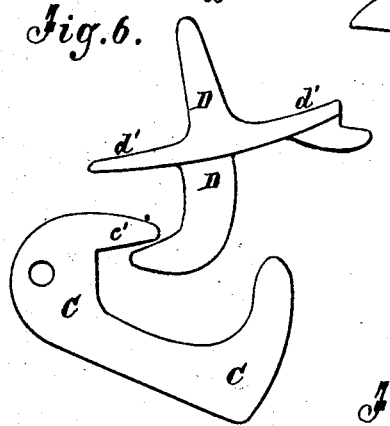
Figure 4:
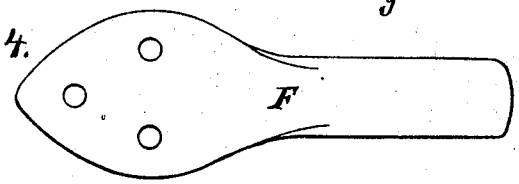
Figure 5:
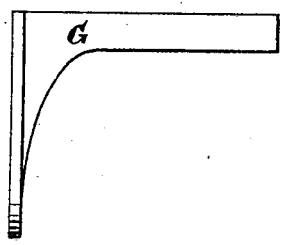

Be it known that I, GEORGE N. SHARP, of La Plata, in the county of Macon and State of Missouri, have invented a new and useful Improvement in Latches for Gates, &c., of which the following is a specification:

Figure 1 is a front view of my improved latch, partly in section, through the line $x\,x$, Fig. 2. Fig. 2 is a detail section of the same taken through the line $y\,y$, Fig. 1. Fig. 3. represents a push-rod. Fig. 4 represents a catch-bar. Fig. 5 represents a bumper. Figs. 6 and 7 are detail views, showing modifications of the catch and lever.

Similar letters of reference indicate corresponding parts.

My invention has for its object to improve the construction of the latch for which Letters Patent No. 128,075 were granted to me June 18, 1872, so as to make it more reliable in use, and less expensive in manufacture.

The invention will first be fully described, and then pointed out in the claims.

A represents the case of the latch, which is cast in two parts, which are held together by a single rivet or screw, B, passing through said parts near their outer end, and which serves as a pivot for the catch C, through a hole in the outer end of which the said screw or rivet B passes. The inner ends of the parts of the case A have outwardly-projecting flanges formed upon them, through which are formed holes or slots to receive the screws by which the latch is secured to the gate, door, or post.

I prefer to make the flanges with slots, as it enables them to be cast in said flanges, and saves drilling.

The catch C moves up and down through a slot in the bottom edge of the case A; and has hooks $c'$ formed upon the outer and inner ends of its upper side, as shown in Fig. 2. D is a lever, the inner arm of which passes through a slot in the top edge of the case A, enters the cavity of the catch C, and its lower end is so formed, as shown in Fig. 2, that, when moved inward, outward, or upward, it may raise the catch C, and unfasten the gate or door. The upper arm of the lever D projects upward, to serve as a thumb-piece or handle for operating it. Upon the lever D is formed a plate, $d'$, which rests upon the upper edge of the case A, and is so formed as to wholly cover said slot or opening, and thus prevent the entrance of rain and snow into the case A, and the consequent formation therein of ice, to impede or prevent the operation of the device. The ends of the plate $d'$ rest upon the top edge of the case A, and serve as fulcrums to the lever D.

By this construction the catch C may be raised to unfasten the gate or door by moving the upper part of the lever D outward, inward, or upward.

If desired, the catch C may have a hook, $c'$, only upon its outer end, as shown in Fig. 6; or only upon its inner end, as shown in Fig. 7; the lower arm of the lever D being correspondingly formed.

With the modification shown in Fig. 6, the catch C is raised by moving the upper arm of the lever D inward; and with the modification shown in Fig. 7, the said catch is raised by moving said upper arm outward.

$a'$ is a partition, formed in the inner part of the case A by flanges formed upon the parts of the said case, which said flanges should be made in sections, so as to interlock with each other, and prevent the parts of the case from getting out of place during transportation. The upper part of the partition $a'$ is curved or arched, to serve as a stop to the catch C when thrown upward by the slamming shut of the gate or door, to cause the catch to drop before the door or gate, in its rebound, can carry the catch-bar out past the catch C. The partition $a'$ also serves as a guide to the push-bar E when inserted through a hole in the door to open said door from the other side. F is the catch-bar, which, when the case A is secured to the gate-post or door-post, is designed to be attached to said door or gate, and which, as the door or gate is swung shut, strikes against, raises, and passes the catch C, which catch drops behind the said catch-bar, and fastens the said door or gate.

If desired, the case A may be secured to the gate or door; and the bumper G, the body of which projects at right angles from its base, is attached to the gate-post or door-post, so as to raise the catch C, and fasten the gate or door as it is swung shut.

H is a rest and guard, which is attached to the gate or door post in such a position as to be directly below the catch-bar F when the door or gate is closed, so that, should there be any tendency to sag, the said catch-bar F may bear upon the rest H, and thus support the gate or door, and prevent any sagging.

Having thus described my invention, I claim as new and desire to secure by Letters Patent—

1. The plate $d'$, formed upon the lever D, in combination with the slotted upper edge of the case A, in which the catch C is pivoted, substantially as herein shown and described.

2. The flanges $a'$, formed upon the inner surface of the inner part of the case A, and arranged, in connection with each other and the plate $d'$ of the lever D, substantially as herein shown and described.

GEORGE NICHOLAS SHARP.

Witnesses:
 J. P. WALLACE,
 C. S. EDWARDS.